United States Patent [19]

Nakamura et al.

[11] Patent Number: 4,676,334

[45] Date of Patent: Jun. 30, 1987

[54] POWER STEERING SYSTEM WITH HYDRAULIC REACTION

[75] Inventors: Keiichi Nakamura, Kariya; Susumu Honaga, Aichi; Mikio Suzuki, Hekinan; Yoshiyuki Takeuchi, Gamagouri, all of Japan

[73] Assignee: Toyoda Koki Kabushiki Kaisha, Kariya, Japan

[21] Appl. No.: 855,722

[22] Filed: Apr. 25, 1986

[30] Foreign Application Priority Data

Apr. 25, 1985 [JP] Japan .................................. 60-89661

[51] Int. Cl.$^4$ ............................................. B62D 5/08
[52] U.S. Cl. .................................. 180/142; 91/375 A; 91/434; 180/148
[58] Field of Search ............... 180/142, 143, 141, 148; 91/375 A, 434

[56] References Cited

U.S. PATENT DOCUMENTS

| | | | |
|---|---|---|---|
| 2,791,287 | 5/1957 | Stolte | 180/143 |
| 2,893,504 | 6/1960 | Jackson | 180/143 |
| 2,917,938 | 12/1959 | Folkerts | 180/147 |
| 2,939,429 | 6/1986 | Charlson | 137/596 |
| 3,171,298 | 3/1965 | Henry-Biabaud | 180/143 |
| 3,406,773 | 10/1968 | Luther | 180/143 |
| 3,408,900 | 11/1968 | Tomita | 91/371 |
| 3,433,127 | 3/1969 | Thompson | 91/372 |
| 3,465,842 | 9/1969 | Hruska | 180/143 |
| 3,833,081 | 9/1974 | Suzuki | 180/143 |
| 3,930,554 | 1/1976 | Ward | 180/143 |
| 3,998,131 | 2/1976 | Adams | 91/372 |
| 4,034,825 | 7/1977 | Adams | 180/143 |
| 4,119,172 | 10/1978 | Yanagishima et al. | 180/142 |
| 4,189,024 | 2/1980 | Jablonsky | 180/133 |
| 4,216,841 | 8/1980 | Ohtuka et al. | 180/141 |
| 4,311,161 | 1/1982 | Narumi | 180/143 |
| 4,329,912 | 5/1982 | de Maight | 180/132 X |
| 4,437,532 | 3/1984 | Nakamura | 180/142 |
| 4,485,883 | 12/1984 | Duffy | 180/142 |

FOREIGN PATENT DOCUMENTS

| | | | |
|---|---|---|---|
| 55-94855 | 7/1980 | Japan | 180/141 |
| 56-148974 | 11/1981 | Japan . | |
| 57-186579 | 11/1982 | Japan . | |
| 821944 | 10/1959 | United Kingdom | 180/132 |
| 1035686 | 7/1966 | United Kingdom | 180/147 |
| 2131364 | 6/1984 | United Kingdom | 180/143 |

Primary Examiner—John A. Pekar
Attorney, Agent, or Firm—Oblon, Fisher, Spivak, McClelland & Maier

[57] ABSTRACT

A power steering system which includes a fluid source that supplies pressure fluid of a constant flow rate, a fluid motor for supplementing manual steering torque, a servo-valve for distributing fluid to the fluid motor, and a reaction device for applying hydraulic reaction or feeling to a steering wheel. A magnetic pressure control valve is connected to the reaction device to control fluid pressure applied thereto in accordance with a vehicle operating condition, such a vehicle speed. A flow dividing valve serves to divide the pressure fluid of a constant flow rate in a predetermined ratio into first and second flows which are respectively directed to the servo-valve and reaction device. The predetermined ratio is varied such that the flow rate of the fluid supplied to the reaction device increases as the pressure of the fluid supplied to the fluid motor increases.

9 Claims, 14 Drawing Figures

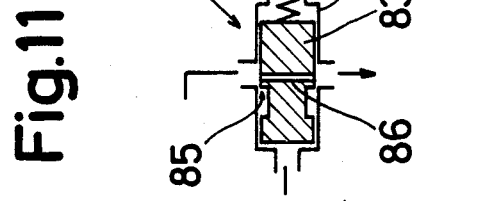
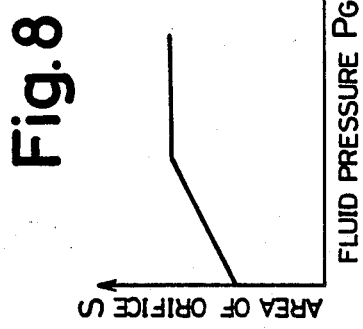
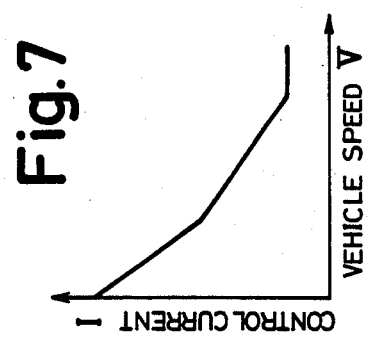
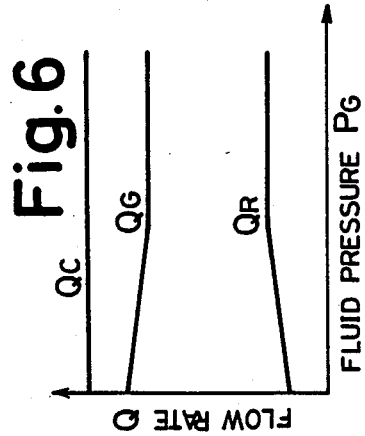
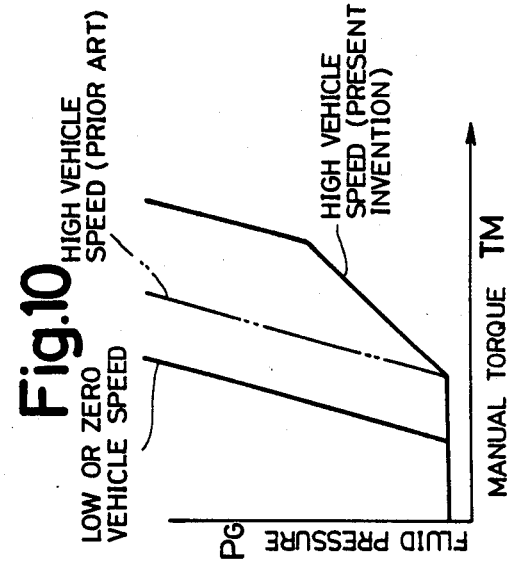
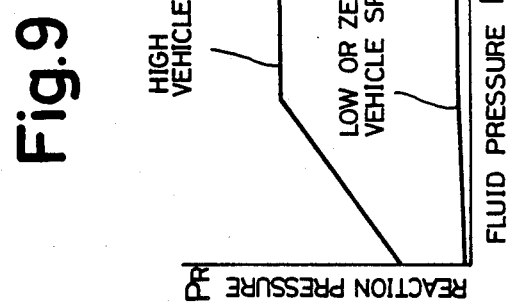

POWER STEERING SYSTEM WITH HYDRAULIC REACTION

BACKGROUND OF THE INVENTION

1. Field of the Invention

The present invention relates to a power steering system wherein power assistance derived therefrom will be modulated according to a vehicle operating condition such as vehicle speed.

2. Description of the Prior Art

In maneuvering a steering wheel of an automotive vehicle, it is recognized that power assistance at high vehicle speeds may desirably be less than at low speeds to allow for stabilization of the steering wheel at high speeds.

A power steering system with the above-mentioned steering characteristics is known having a reaction device which in accordance with fluid pressure supplied thereto provides resistance against relative rotation between valve elements of a servo-valve. The servo-valve controls fluid flow to and from a fluid motor according to the relative rotation between the valve elements, which, in turn, generates the power assistance. The fluid pressure supplied to the reaction device is to be controlled at a low level when high power assistance is necessary at low vehicle speeds, and on the contrary, at a high level when less power assistance is required at high vehicle speeds.

Conventionally, the fluid pressure supplied to the reaction device is controlled by a solenoid-operated control valve in accordance with vehicle speed and has no relation with the fluid pressure applied to the fluid motor.

In such prior art, as shown by the two-dot chain line in FIG. 10, the fluid pressure curve at high vehicle speeds corresponding to pressure supplied to the fluid motor with a manual torque applied to the servo-valve by means of a steering wheel is such that the fluid pressure curve at low vehicle speeds is parallelly shifted rightward by adding a certain amount of manual torque. Consequently, there is a problem in that variation of steering effort is poor while the steering wheel is turned at high vehicle speeds. To obtain a desirable variation of steering effort while turning the steering wheel at high vehicle speeds, the slope of the fluid pressure curve is expected to be gentle as shown by the full line in FIG. 10.

SUMMARY OF THE INVENTION

It is therefore an object of the present invention to provide a power steering system with hydraulic reaction, wherein a desirable variation of steering effort can be obtained while turning the steering wheel at high vehicle speeds.

Another object of the present invention is to provide a power steering system with hydraulic reaction, wherein the slope of the fluid pressure curve at high vehicle speeds is gentle.

Briefly, according to the present invention, these and other objects are achieved by providing a power steering system with hydraulic reaction including fluid source means for supplying pressure fluid of a constant flow rate, a fluid motor, a servo-valve for distributing pressure fluid to said fluid motor in accordance with relative rotation between input and output shafts, reaction means for providing resistance against relative rotation between input and output shafts, magnetic pressure control valve means for controlling fluid pressure applied to the reaction means in accordance with vehicle operating condition, flow dividing valve means for dividing the pressure fluid from the fluid source means in a predetermined ratio into a first fluid flow directed to the servo-valve and a second fluid flow to the reaction means, and control means for varying the predetermined ratio so as to increase the flow rate of the fluid supplied to the reaction means as the pressure of the fluid supplied to the servo-valve increases.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 6 is a graph showing the flow rates of the pressure fluid QC supplied by the fluid source, of the first fluid QG directed to the servo-valve and of the second fluid QR directed to the reaction means, as plotted against the fluid pressure supplied to the fluid motor;

FIG. 7 is a graph showing the control current, as plotted against vehicle speed;

FIG. 8 is a graph showing the area of the orifice of the flow dividing valve, as plotted against the fluid pressure supplied to the fluid motor;

FIG. 9 is a graph showing the fluid pressure applied to the reaction means, as plotted against the fluid pressure supplied to the fluid motor;

FIG. 10 is a graph showing the fluid pressure supplied to the fluid motor, as plotted against the manual torque applied to the servo-valve;

FIG. 11 is a diagrammatic view of a second embodiment of the control means for varying the area of the orifice;

DESCRIPTION OF THE PREFERRED EMBODIMENTS

Figure 1:
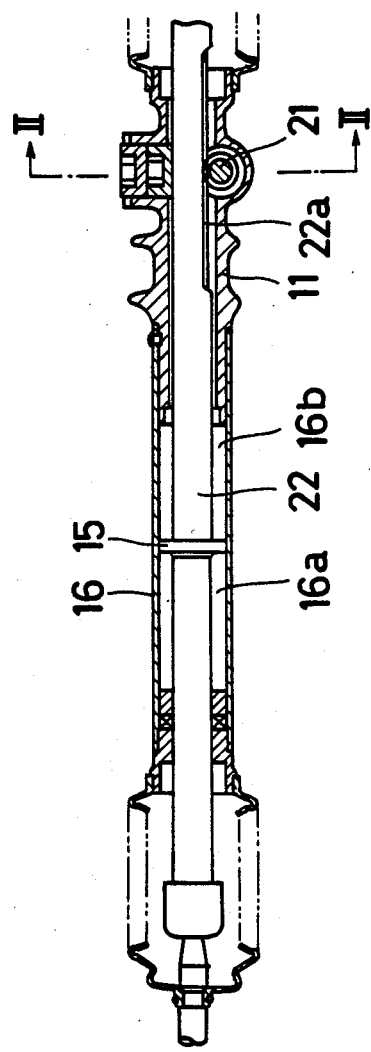
FIG. 1 is a longitudinal section view of a power steering system according to the present invention.

Referring to the drawings and to FIG. 1 in particular, reference numeral 11 designates a gear housing that is fixedly mounted on a chassis of an automotive vehicle. A steering rod 22 is slidably mounted on gear housing 11, with opposite ends thereof extending outwardly from gear housing 11. Respective ends of steering rod 22 are connected to steerable wheels of the vehicle by way of a conventional steering link mechanism. A piston 15 of a fluid motor is fixedly attached to a middle portion of steering rod 22 and is slidably accommodated in a cylinder tube 16 that is unitarily connected to gear housing 11.

Figure 2:
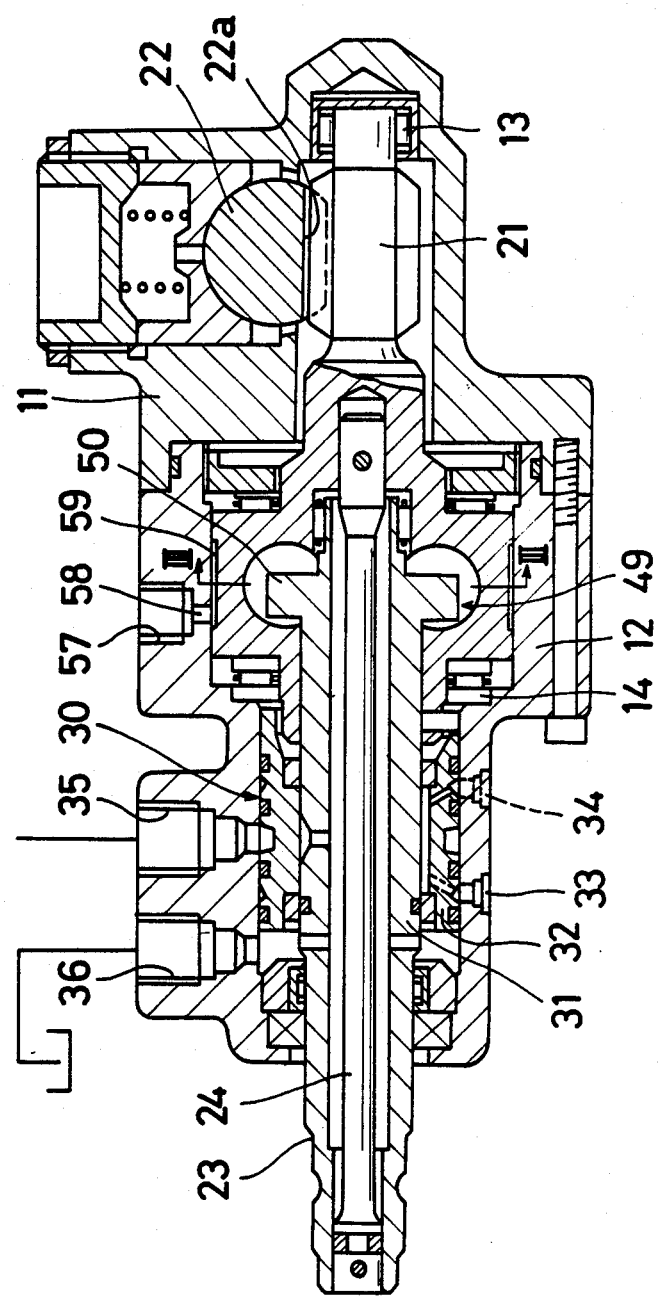
FIG. 2 is an enlarged sectional view taken along line II—II of FIG. 1.

Referring now to FIG. 2, valve housing 12 is fixedly attached to gear housing 11. An output shaft 21 is rotatably journalled to gear housing 11 and valve housing 12 by means of a pair of bearings 13, 14 in perpendicular relation with steering rod 22. A pinion is provided on output shaft 21 and is engaged with a rack 22a which is formed on steering rod 22.

Valve housing 12 accommodates servo-valve 30 which comprises a sleeve valve member 32 and a rotary valve member 31. Sleeve valve member 32 is rotatably housed in valve housing 12 in coaxial relation with output shaft 21. Rotary valve member 31 is formed on an input shaft 23 which is connected to a steering wheel. Input shaft 23 is flexibly connected to output shaft 21 by means of a torsion bar 24. A plurality of axially extending slots (not shown) are formed on an internal surface of sleeve valve member 32 and on a circumferential surface of rotary valve member 31 at regular intervals. Thus, according to the relative rotation between sleeve valve member 32 and rotary valve member 31, a supply port 35 communicates with one of cylinder ports 33, 34 which are respectively in fluid communication with left and right chambers 16a, 16b of the fluid motor, and an exhaust port 36 communicates with the remaining port of cylinder ports 33, 34. Sleeve valve member 32 is connected to the inner end of output shaft 21 with a spline engagement.

Figure 3:
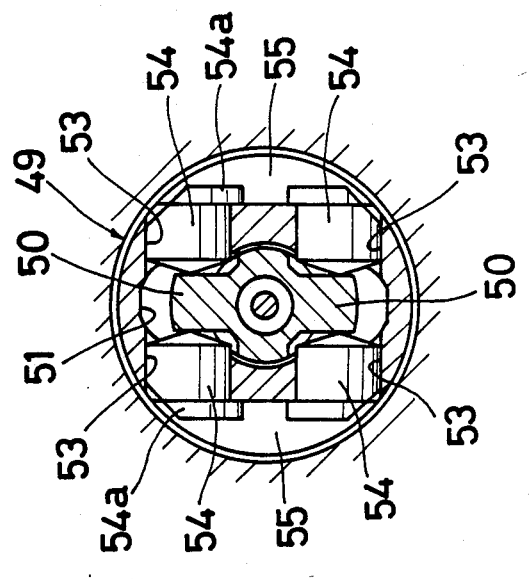
FIG. 3 is a cross-sectional view taken along line III-—III of FIG. 2.

FIGS. 2 and 3 show in detail the construction of a reaction device 49. The interior end of input shaft 23 is provided with a pair of radial projections 50 which are received with a predetermined clearance within respective recesses 51 formed in a large diameter portion of output shaft 21, so as to allow relative rotation between input and output shafts 23, 21 by an angle of several degrees.

Two pairs of bores 53 are formed in the large diameter portion of output shaft 21, facing respective sides of respective radial projections 50. Plungers 54 are slidably received in respective bores 53 and are urged toward radial projections 50 by means of fluid pressure supplied to reaction chambers 55 which are formed in output shaft 21 and which accommodate the rear portion of plungers 54 therein. Forward movements of plungers 54 is limited by abutment of flanges 54a formed on plungers 54 at rear ends thereof with bottom surfaces of reaction chambers 55 so as to hold projections 50 at a central position. Fluid pressure controlled in accordance with vehicle operating condition such as vehicle speed is supplied to reaction chambers 55 by way of a port 57, a conduit 58 and an annular recess 59 formed on a periphery of the large diameter portion of output shaft 21.

Figure 4:
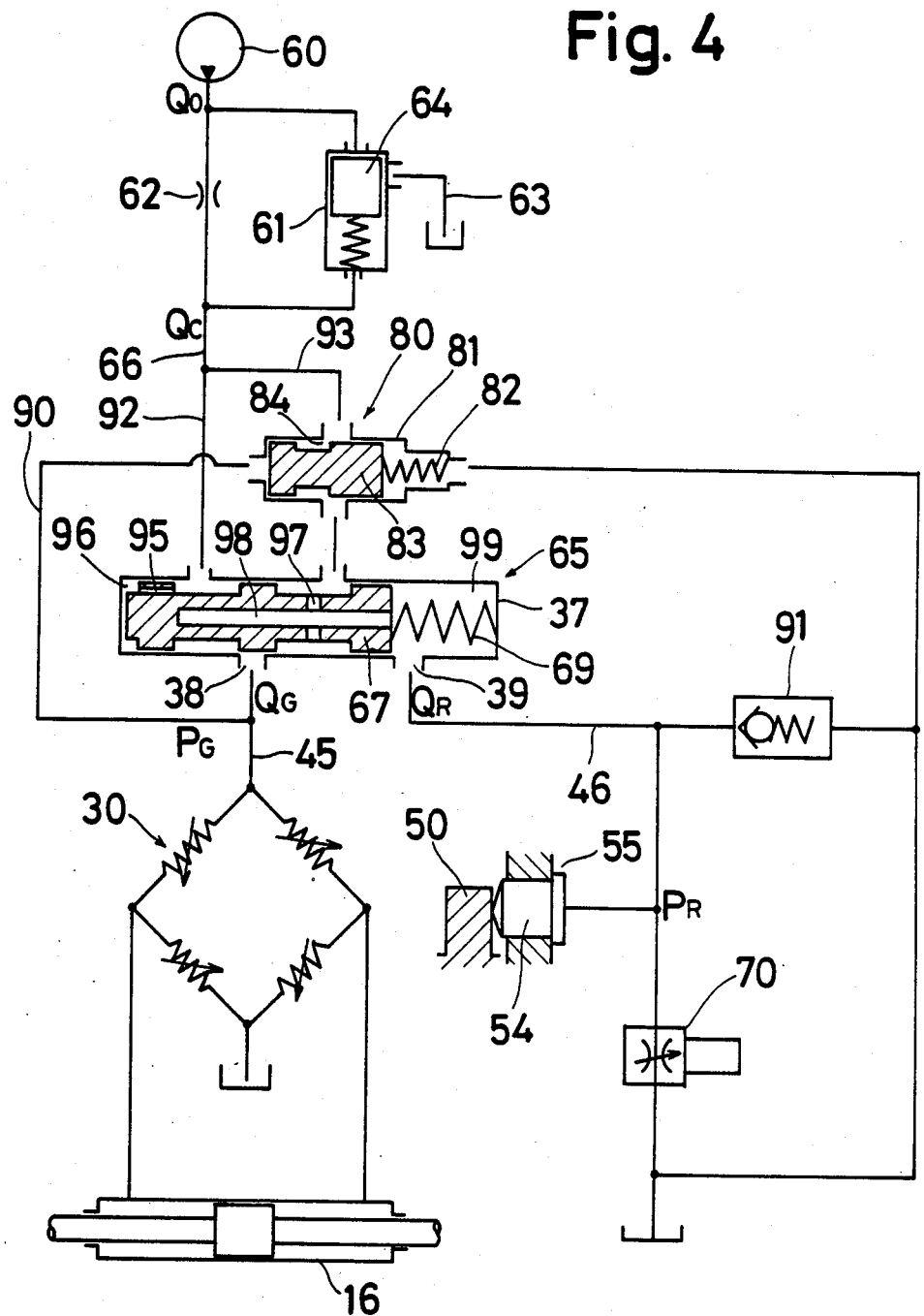
FIG. 4 is a diagrammatic view of the power steering system according to the present invention.

As shown in FIG. 4, reference numeral 60 designates a pump that is driven by an engine of the vehicle. An outlet port of pump 60 is connected to a flow control valve 61 which comprises a metering orifice 62 and a bypass valve spool 64 that is moved in accordance with the pressure differential across metering orifice 62 so as to keep the pressure differential constant. Thus, pressure fluid QO discharged from pump 60 is divided into pressure fluid QC of a constant flow rate flowing through metering orifice 62 and any existing excess flow led to a bypass passage 63 according to the function of flow control valve 61. When pump 60 is driven by an electric motor with constant speed to discharge pressure fluid of a constant rate, flow control valve 61 is unnecessary.

A flow dividing valve 65 is connected to an outlet port of flow control valve 61 by way of a conduit 66. Flow dividing valve 65 includes valve casing 37 provided with first and second outlet ports 38, 39. A valve spool 67 is positioned in valve casing 37 and is movable so as to vary the opening areas of first and second outlet ports 38, 39 with respective land portions formed thereon in an inverse manner with respect to each other. Flow dividing valve 65 includes first and second flow paths 92, 93 which respectively connect conduit 66 to first and second outlet ports 38, 39 through the interior of valve casing 37. An orifice 84 is located in second flow path 93 while a spring 69 is accommodated in a rear chamber 99 of valve casing 37 and urges valve spool 67 in a direction to open second outlet port 39 and inversely to close first outlet port 38. First flow path 92 communicates with a front chamber 96 of valve casing 37 by way of a hole 95 formed in valve spool 67. Orifice 84 communicates with rear chamber 99 by way of passages 97, 98 formed in spool valve 67. Thus, valve spool 67 is urged against spring 69 by the pressure difference across orifice 84 to divide pressure fluid QC into first and second fluid flow QG, QR discharged from first and second outlet ports 38, 39. First and second outlet ports 38, 39 are respectively connected to servo-valve 30 and reaction chambers 55 by way of conduits 45, 46.

A control valve 80 includes a control housing 81 provided with orifice 84, a control member 83 movably accommodated in control housing 81 to vary the area of orifice 84, and spring 82 to urge control member 83 to a left end position where the area of orifice 84 is at a minimum. First fluid flow QG discharged from first outlet port 38 is also introduced into a left chamber of control casing 81 by way of a conduit 90 so as to move control member 83 against spring 82 and, accordingly, to increase the area of orifice 84 in accordance with the increase of the fluid pressure PG supplied to fluid motor 16 by way of servo-valve 30. As a result, the rate of second fluid flow QR increases and, inversely, the rate of first fluid flow QG decreases as the fluid pressure PG supplied to fluid motor 16 increases. A conventional pressure relief valve 91 is connected to conduit 46 to relieve excess pressure if such occurs in the circuit. A magnetic control valve 70 is also connected to reaction chambers 55 so as to control fluid pressure PR applied to reaction chamber 55 in accordance with a vehicle operating condition such as vehicle speed.

Figure 5:
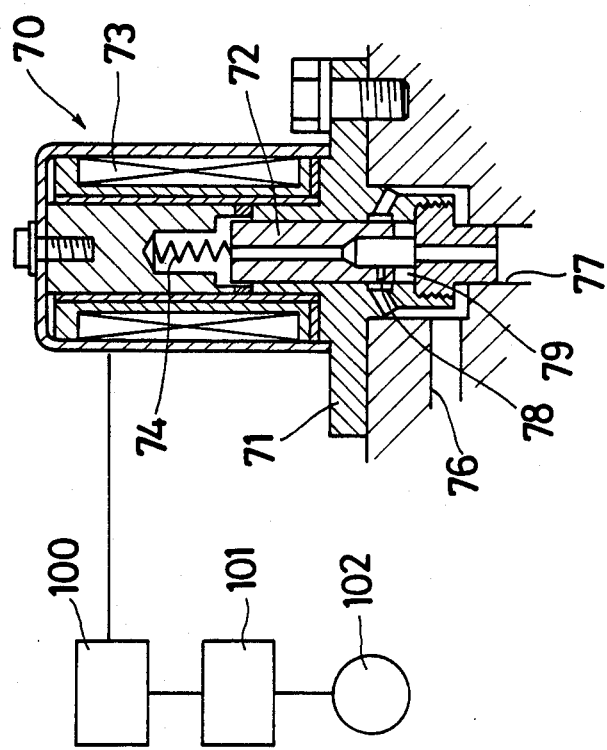
FIG. 5 is a longitudinal sectional view of the magnetic pressure control valve shown in FIG. 4.

Referring now to FIG. 5, magnetic control valve 70 is provided with a valve body 71, a spool 72 slidably accommodated in valve body 71, and a solenoid 73 secured to valve body 71. Spool 72 is urged by a spring 74 to a downward end position where passages 76, 77 which are respectively connected to reaction chambers 55 and a reservoir communicate with each other through a small hole 78 formed in spool 72. Solenoid 73 is connected to a solenoid drive circuit 100 which in turn is controlled by a computer 101. Accordingly, as shown in FIG. 7, solenoid drive circuit 100 generates current I in accordance with a signal proportional to vehicle speed V generated from a conventional speedometer 102. A slit 79 is formed at the bottom end portion of spool 72 so that when spool 72 is lifted up against spring 74 with excitation of solenoid 73, passage 76 and 77 communicate with each other through slit 79 as well as small hole 78. Control current I may be modulated with another vehicle operating condition such as load weight.

Operation of the power steering system as described above will now be explained. Fluid flow QO discharged from pump 60 is divided into fluid flow QC of a constant rate and excess flow by flow control valve 61. Fluid flow QC is in turn divided into first fluid flow QG led to supply port 35 of servo-valve 30 and second fluid flow QR led to reaction device 49 by flow dividing valve 65. At a low vehicle speed, since a relatively large current I is supplied to solenoid 73 of magnetic control valve 70 as shown in FIG. 7, spool 72 is largely lifted up to open the slit to a maximum degree. Therefore, as second fluid flow QR is drained to reservoir without substantial restriction, reaction fluid pressure PR is hardly generated in reaction chambers 55. Thus, when input shaft 23 is turned according to manual maneuvering of the steering wheel, plungers 54 are easily retracted, resulting in easy relative rotation between sleeve valve member 32 and rotary valve member 31 in a usual power assisted steering operation where the fluid pressure PG supplied to fluid motor 16 changes in accordance with the manual torque TM applied to input shaft 23 as shown by a curve corresponding to low or zero vehicle speed in FIG. 10.

As current I supplied to solenoid 73 decreases in accordance with the increase in vehicle speed, spool 72 is proportionately moved downward by spring 74 to close slit 79. Thus, second fluid flow QR is throttled so as to increase reaction fluid pressure PR, and, accordingly, plungers 54 offer resistance to the rotation of projections 50. Such resistance increases the manual torque which is necessary to generate relative rotation between sleeve valve member 32 and rotary valve member 31 and, as a result, produce less power assistance at high vehicle speeds than at low vehicle speeds.

While maneuvering the steering wheel, the same pressure PG as supplied to fluid motor 16 is introduced to the left chamber of control casing 81 to proportionately move control member 83, and accordingly increase the area S of orifice 84 as shown in FIG. 8. After control member 83 reaches the end of its stroke, the area S is kept constant. Therefore, flow dividing device 65 increases the rate of second fluid flow QR and decreases the rate of first fluid flow QG as the pressure PG increases. At low or zero vehicle speeds, as second fluid flow QR is drained to reservoir without substantial restriction, such increase in the rate of second fluid flow QR hardly increases reaction fluid pressure PR.

However, at high vehicle speeds, as second fluid flow QR is throttled by magnetic control valve 70, the increase in the rate of second fluid flow QR results in a proportionate increase of reaction fluid pressure PR as shown in FIG. 9. Accordingly, in the present invention fluid pressure PG supplied to fluid motor 16 increases more slowly as manual torque TM increases than in the prior art so as to provide a stable feeling in turning the steering wheel at high vehicle speeds.

Another example of control valve 80 is shown in FIG. 11, wherein a constant orifice 86 is made in control member 83, and in control housing 81 another orifice 85 is made whose area is varied by control member 83.

Figure 12:
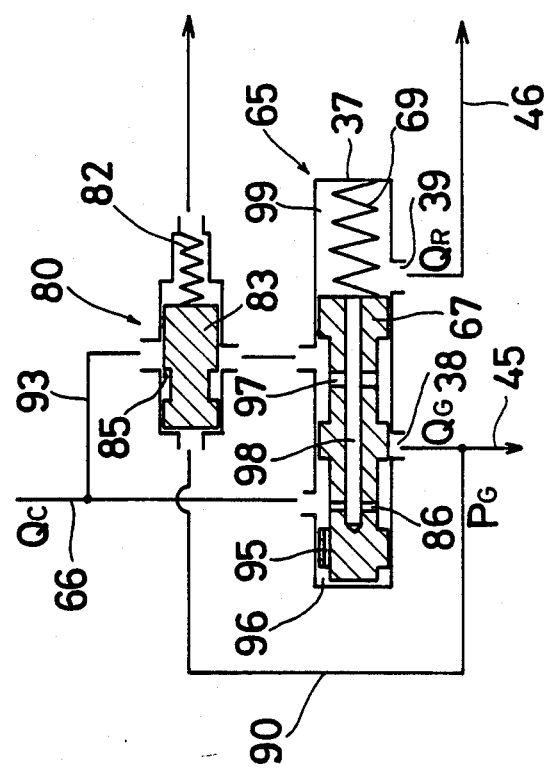
FIG. 12 is a diagrammatic view of a third embodiment of the control means.

Further, as shown in FIG. 12, in spool valve 67 of flow dividing valve 65 a constant orifice 86 may be made which is connected to rear chamber 99 of valve casing 37 by way of a passage 98 made in spool valve 67.

A variable orifice 85 is similarly located in second flow path 93 and is varied by control valve 80.

Although in the above-described embodiments, reaction device 49 is constructed such that a pair of radial projections 50 are formed on input shaft 23, and two pairs of plungers are slidably received in output shaft 21 and are urged toward the respective sides of projections 50 by the fluid pressure so as to provide resistance against relative rotation between input and output shafts 23, 21, the same effect as in the above-described embodiments can be obtained in the case where plungers are radially slidably received in output shaft 21 and are urged by the fluid pressure toward V-shaped grooves which are axially made on the periphery of input shaft 23, or in another case where plungers are axially slidably received in output shaft 21 and are urged by the fluid pressure toward V-shaped grooves which are radially made on a flange portion of input shaft 23.

Figure 13:
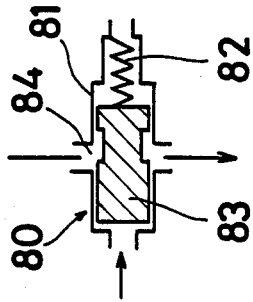
FIG. 13 is a diagrammatic view of a fourth embodiment of the control means.

Further, although in the above-described embodiments, first outlet port 38 is connected to servo-valve 30 and second outlet port 39 is connected to reaction chamber 55, first outlet port 38 may, vice versa, be connected to reaction chambers 55, and second outlet port 39 to servo-valve 30. However, in this case, control valve 80 needs to be composed such that the area of orifice 84 decreases in accordance with the increase of the fluid pressure PQ supplied to fluid motor 16 as shown in FIG. 13.

Figure 14:
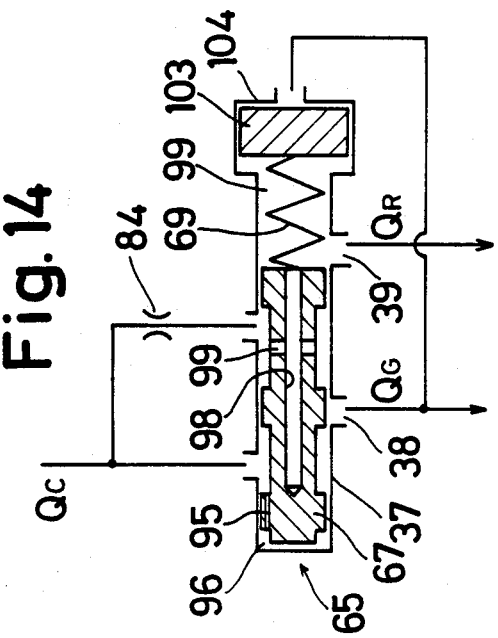
FIG. 14 is a diagrammatic view of an embodiment of the control means for varying the force of the biasing means of the flow dividing valve.

Moreover, although in the above-described embodiments, the area of orifice 84 of flow dividing valve 65 is varied in accordance with the fluid pressure PG supplied to fluid motor 16, instead, the force of spring 69 of flow dividing valve 65 may be varied in accordance with the fluid pressure PG. As shown in FIG. 14, spring 69 is seated on a piston 103 which is accommodated in a cylinder 104. Piston 103 is moved by the fluid pressure PG supplied to fluid motor 16 so as to vary the force of spring 69 in accordance therewith.

Obviously, numerous modifications and variations of the present invention are possible in light of the above teachings, it is therefore to be understood that within the scope of the appended claims, the invention may be practiced otherwise than as specifically decribed herein.

What is claimed as new and desired to be secured by Letters Patent of the United States is:

1. A power steering system which utilizes fluid source means for supplying pressure fluid of a constant flow rate and a fluid motor means for supplementing manual steering torque, comprising:
   a valve housing;
   a rotatable output shaft partially positioned within said valve housing and operatively connected with said fluid motor;
   a rotatable input shaft partially positioned within said valve housing, aligned with said output shaft and adapted for manual actuation;
   servo-valve means located in said valve housing for distributing fluid flow to said fluid motor in accordance with relative rotation between said input and output shaft;
   reaction means located in said valve housing for providing resistance against relative rotation between said input and output shaft in accordance with fluid pressure supplied thereto:
   magnetic pressure control valve means connected to said reaction means for controlling fluid pressure applied thereto in accordance with a vehicle operating condition;

flow dividing valve means for dividing said pressure fluid from said fluid source means in a predetermined ratio into a first fluid flow directed to said servo-valve means and a second fluid flow directed to said reaction means; and control means for varying said predetermined ratio so as to increase the flow rate of said second fluid flow as the pressure of the fluid supplied to said fluid motor means increases.

2. A power steering system which utilizes fluid source means for supplying pressure fluid of a constant flow rate and a fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto:

magnetic pressure control valve means connected to said reaction means for controlling fluid pressure applied thereto in accordance with a vehicle operating condition;

flow dividing valve means including a valve casing having first and second outlet ports, a valve member movable in said valve casing so as to vary opening areas of said first and second outlet ports in an inverse manner with respect to each other, first flow path means for connecting said fluid source means to said first outlet port through the interior of said valve casing; second flow path means for connecting said fluid source means to said second outlet port through the interior of said valve casing; orifice means located in said second flow path means; and biasing means for urging said valve member in a direction so as to open said second outlet port, said valve member being urged against said biasing means by the pressure difference across said orifice means, one of said first and second outlet ports being connected to said servo-valve means and a remaining port of said first and second outlet ports being connected to said reaction means; and control means for varying the area of said orifice means in accordance with the pressure of the fluid supplied to said fluid motor means such that the flow rate of the fluid supplied to said reaction means increases as the pressure supplied to said fluid motor means increases.

3. A power steering system which utilizes fluid source means for supplying pressure fluid of a constant flow rate and a fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto:

magnetic pressure control valve means connected to said reaction means for controlling fluid pressure applied thereto in accordance with a vehicle operating condition;

flow dividing valve means including a valve casing having first and second outlet ports, a valve member movable in said valve casing so as to vary opening areas of said first and second outlet ports in an inverse manner with respect to each other, first flow path means for connecting said fluid source means to said first outlet port through the interior of said valve casing; second flow path means for connecting said fluid source means to said second outlet port through the interior of said valve casing; orifice means located in said second flow path means; and biasing means for urging said valve member in a direction so as to open said second outlet port, said valve member being urged against said biasing means by the pressure difference across said orifice means, one of said first and second outlet ports being connected to said servo-valve means and a remaining port of said first and second outlet ports being connected to said reaction means; and control means for increasing the area of said orifice means in accordance with an increase of the fluid pressure supplied to said fluid motor means.

4. A power steering system as set forth in claim 3, wherein said control means further comprises:

a control member movably acccommodated in a control housing for varying the area of said orifice means;

biasing means for urging said control member in a direction so as to decrease the area of said orifice means; and means for urging said control member against said biasing means in accordance with the fluid pressure supplied to said fluid motor means.

5. A power steering system as set forth in claim 4, wherein said orifice means comprises:

a first orifice having a fixed area; and a second orifice whose area is varied by said control member.

6. A power steering system which utilizes fluid source means for supplying pressure fluid of a constant flow rate and a fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto:

magnetic pressure control valve means connected to said reaction means for controlling fluid pressure applied thereto in accordance with a vehicle operating condition;

flow dividing valve means including a valve casing having first and second outlet ports, a valve member movable in said valve casing so as to vary opening areas of said first and second outlet ports in an inverse manner with respect to each other, first flow path means for connecting said fluid source means to said first outlet port through the interior of said valve casing; second flow path means for connecting said fluid source means to said second outlet port through the interior of said valve casing; orifice means located in said second flow path means; and biasing means for urging said valve member in a direction so as to open said second outlet port, said valve member being urged against said biasing means by the pressure difference across said orifice means, said first outlet port being connected to said reaction means and said second outlet port to said servo-valve means; and control means for decreasing the area of said orifice means in accordance with an increase in the fluid pressure supplied to said fluid motor means.

7. A power steering system as set forth in claim 6, wherein said control means further comprises:

a control member movably positioned in a control housing for varying the area of said orifice means;

biasing means for urging said control member in a direction so as to increase the area of said orifice means; and means for urging said control member against said biasing means in accordance with the fluid pressure supplied to said fluid motor means.

8. A power steering system as set forth in claim 7, wherein said orifice means comprises:

a first orifice having a fixed area; and a second orifice an area of which is varied by said control member.

9. A power steering system which utilizes fluid source means for supplying pressure fluid of a constant flow rate and a fluid motor means for supplementing manual steering torque, comprising:

a valve housing;

a rotatable output shaft partially positioned within said valve housing and operatively connected with said fluid motor;

a rotatable input shaft partially positioned within said valve housing, aligned with said output shaft and adapted for manual actuation;

servo-valve means located in said valve housing for distributing fluid flow to said fluid motor in accordance with relative rotation between said input and output shaft;

reaction means located in said valve housing for providing resistance against relative rotation between said input and output shaft in accordance with fluid pressure supplied thereto:

magnetic pressure control valve means connected to said reaction means for controlling fluid pressure applied thereto in accordance with a vehicle operating condition;

flow dividing valve means including a valve casing having first and second outlet ports, a valve member movable in said valve casing so as to vary opening areas of said first and second outlet ports in an inverse manner with each other, first flow path means for connecting said fluid source means to said first outlet port through the interior of said valve casing; second flow path means for connecting said fluid source means to said second outlet port through the interior of said valve casing; orifice means located in said second flow path means; and biasing means for urging said valve member in a direction so as to open said second outlet port, said valve member being urged against said biasing means by the pressure difference across said orifice means, one of said first and second outlet ports being connected to said servo-valve means and a remaining port of said first and second outlet ports being connected to said reaction means; and control means for varying the force of said biasing means in accordance with the pressure of the fluid supplied to said fluid motor means such that the flow rate of the fluid supplied to said reaction means increases as the pressure supplied to said fluid motor means increases.

* * * * *